(12) United States Patent
Liao et al.

(10) Patent No.: US 7,833,420 B2
(45) Date of Patent: Nov. 16, 2010

(54) METHOD FOR CLEANING RECLAIMED WATER REUSE DEVICE

(75) Inventors: Zhimin Liao, Shenzhen (CN); Rong Li, Shenzhen (CN); Jijun Wu, Shenzhen (CN); Jingkui Guo, Shenzhen (CN); Mao Yang, Shenzhen (CN); Yuhe Huang, Shenzhen (CN); Aiguo Wan, Shenzhen (CN)

(73) Assignee: Shenzhen JDL Environmental Protection Ltd., Shenzhen (CN)

( * ) Notice: Subject to any disclaimer, the term of this patent is extended or adjusted under 35 U.S.C. 154(b) by 14 days.

(21) Appl. No.: 12/429,387

(22) Filed: Apr. 24, 2009

(65) Prior Publication Data

US 2009/0206036 A1   Aug. 20, 2009

Related U.S. Application Data

(63) Continuation of application No. 11/858,921, filed on Sep. 21, 2007, now Pat. No. 7,556,730.

(30) Foreign Application Priority Data

Sep. 21, 2006   (CN) .................. 2006 1 0062687

(51) Int. Cl.
*C01F 3/00* (2006.01)
(52) U.S. Cl. .................................. 210/739; 210/741
(58) Field of Classification Search ................. 210/739, 210/741
See application file for complete search history.

(56) References Cited

U.S. PATENT DOCUMENTS

2007/0138092 A1* 6/2007 Smith et al. .................. 210/636
2007/0138096 A1* 6/2007 Tarr et al. .................... 210/650

* cited by examiner

*Primary Examiner*—Chester T Barry
(74) *Attorney, Agent, or Firm*—Matthias Scholl P.C.; Matthias Scholl

(57) ABSTRACT

A method for cleaning a reclaimed water reuse device, the reclaimed water reuse device comprising a clean water supply device, a first aeration device, a backwash device and a membrane module, the method comprising detecting an operating signal of the clean water supply device; enabling the first aeration device or the backwash device according to the operating signal, so as to perform backwash of the membrane module; and completing washing back and restoring to a normal operating state.

14 Claims, 5 Drawing Sheets

METHOD FOR CLEANING RECLAIMED WATER REUSE DEVICE

CROSS-REFERENCE TO RELATED APPLICATIONS

This application is a divisional application of U.S. Ser. No. 11/858,921 filed on Sep. 21, 2007, now U.S. Pat. No. 7,556,730, and claims priority benefits to Chinese Patent Application No. 200610062687.7, filed on Sep. 21, 2006. The contents of all of these specifications are incorporated herein by reference.

BACKGROUND OF THE INVENTION

1. Field of the Invention

The invention relates to the field biochemical engineering, and particularly to a method for cleaning a reclaimed water reuse device.

2. Description of the Related Art

The most frequently used methods of physical cleaning include backwash and aeration. These methods need to be performed frequently and thus may influence the filtering process. During backwash, permeation through the membrane is stopped momentarily. Air or water flows through the membranes in a reverse direction to physically dislodge solids off of the membranes. During aeration, bubbles are produced in the tank water below the membranes. As the bubbles rise, they agitate or scrub the membranes and thereby dislodge some solids while creating an air lift effect and circulation of the tank water to carry the solids away from the membranes. The physical cleaning requires a large amount of aeration and energy, long cleaning time, and features comparatively poor cleaning quality.

Chemical cleaning is typically performed by removing membrane modules from the MBRs, and then immersing the membrane modules into a chemical solution. The chemical cleaning process may be complex and time-consuming.

SUMMARY OF THE INVENTION

In view of the above-described problems, it is one objective of the invention to provide a method for cleaning a reclaimed water reuse device that is simple, effective, and features good cleaning quality.

To achieve the above objective, in accordance with one aspect of the present invention, there is provided a method for cleaning a reclaimed water reuse device of the invention comprising: (a) detecting an operating signal of the clean water supply device, (b) enabling the first aeration device or the backwash device according to the operating signal, so as to perform backwash on the membrane module, and (c) completing the wash back and restoring to a normal operating state.

In certain classes of this embodiment, the reclaimed water reuse device further comprises a contaminated-soil backflow device, a second aeration device and a control module.

In certain classes of this embodiment, the method for cleaning a reclaimed water reuse device further comprises setting a timing period and enabling the contaminated-soil backflow device when the timing period is up.

In certain classes of this embodiment, the step of setting a timing period and enabling the contaminated-soil backflow device as the timing period is up comprises (a) starting and entering an operating state by the reclaimed water reuse device, (b) setting the timing period, and (c) alternately enabling the contaminated-soil backflow device and the first aeration device and the second aeration device.

In certain classes of this embodiment, clean water supply device comprises a clean water supply pipe, a self-priming pump, an electromagnetic valve, and a pressure gauge.

In certain classes of this embodiment, the step of enabling the first aeration device or the backwash device according to the operating signal, so as to perform backwash on the membrane module comprises (a) setting a pressure threshold and a frequency threshold; (b) receiving a pressure signal from the pressure gauge by the control module, the pressure signal indicating a self-priming pressure of the self-priming pump; (c) comparing the pressure threshold with the self-priming pressure; and (d) if the self-priming pressure exceeds the pressure threshold, detecting whether the frequency at which the self-priming pressure of the self-priming pump exceeds the pressure threshold is greater than the frequency threshold.

In certain classes of this embodiment, the step of enabling the first aeration device or the backwash device according to the operating signal, so as to perform backwash on the membrane module further comprises (a) if the frequency at which the self-priming pressure of the self-priming pump exceeds the pressure threshold is greater than the frequency threshold, performing chemical backwash of the membrane module, and (b) if the frequency at which the self-priming pressure of the self-priming pump exceeds the pressure threshold is less than the frequency threshold, enabling the first aeration device and the backwash device to perform physical backwash of the membrane module.

Advantages of the invention include:

(a) cleaning and regeneration of the membrane module in the membrane filtering pool can be accomplished without removing the membrane module from the membrane filtering pool, which greatly simplifies an operating process;

(b) while the membrane module is cleaned and regenerated, the activity in the biological reaction tank will not be affected (namely, a seamless operation between cleaning and normal operation is implemented), and the MBR can be restored to normal operation in a relatively short amount time;

(c) since the invention integrates the first aeration device with the backwash device, it is easy to apply physical (aeration) backwash, chemical backwash, or a combination thereof, to facilitate complete cleaning, and to regenerate the membrane module to a great extent; therefore, the invention features simple operation and good cleaning efficiency;

(d) space separated by the separating plate forms a membrane filtering pool, which makes it applicable to all types of water processing systems such as normal active contaminated-soil processing device, oxidation ditch processing device, contact oxidation processing device, and so on, in a cost-effective and simple manner;

(e) the contaminated-soil backflow device is connected to the inlet-drainage device, so that the high concentration contaminated soil in the membrane filtering pool is able to flow back, which reduces the concentration of the contaminated soil, mitigates pollution of the membrane module caused by the high concentration of contaminated soil, and further improves applicability and reliability of the invention; and lastly (f) the control module controls operating states of all devices, and thus facilitates automation of operation and standardization or MBR devices, improves operation efficiency, and makes the invention applicable to large-scale production.

BRIEF DESCRIPTION OF THE DRAWINGS

The invention is described hereinafter with reference to accompanying drawings, in which.

DETAILED DESCRIPTION OF THE EMBODIMENTS

Detailed description will be given below in conjunction with accompany drawings.

Figure 1:
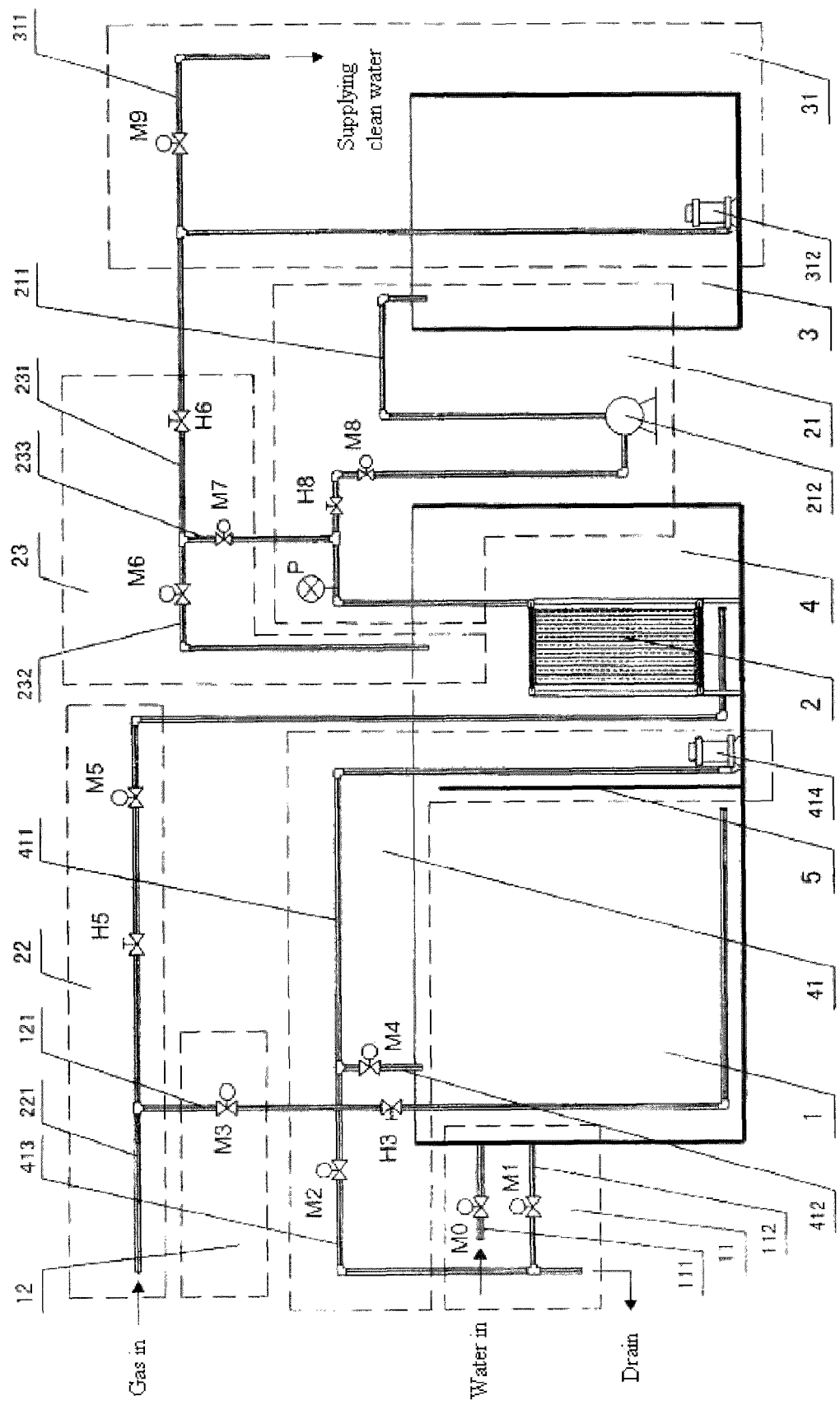
FIG. 1 is a schematic diagram of a reclaimed water reuse device according to one embodiment the invention.
Figure 2:
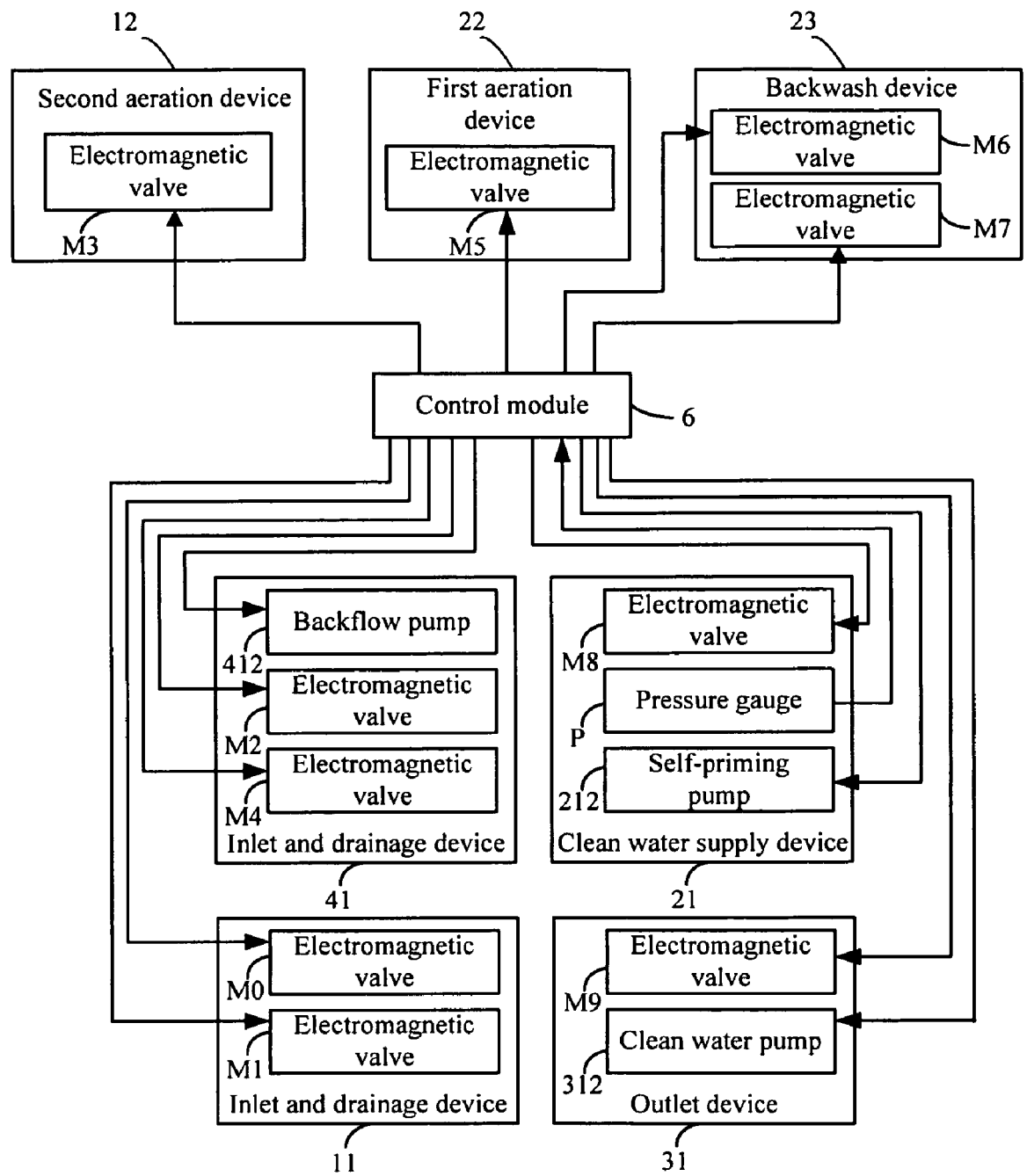
FIG. 2 is a block diagram of a reclaimed water reuse device according to one embodiment of the invention.
Figure 3:
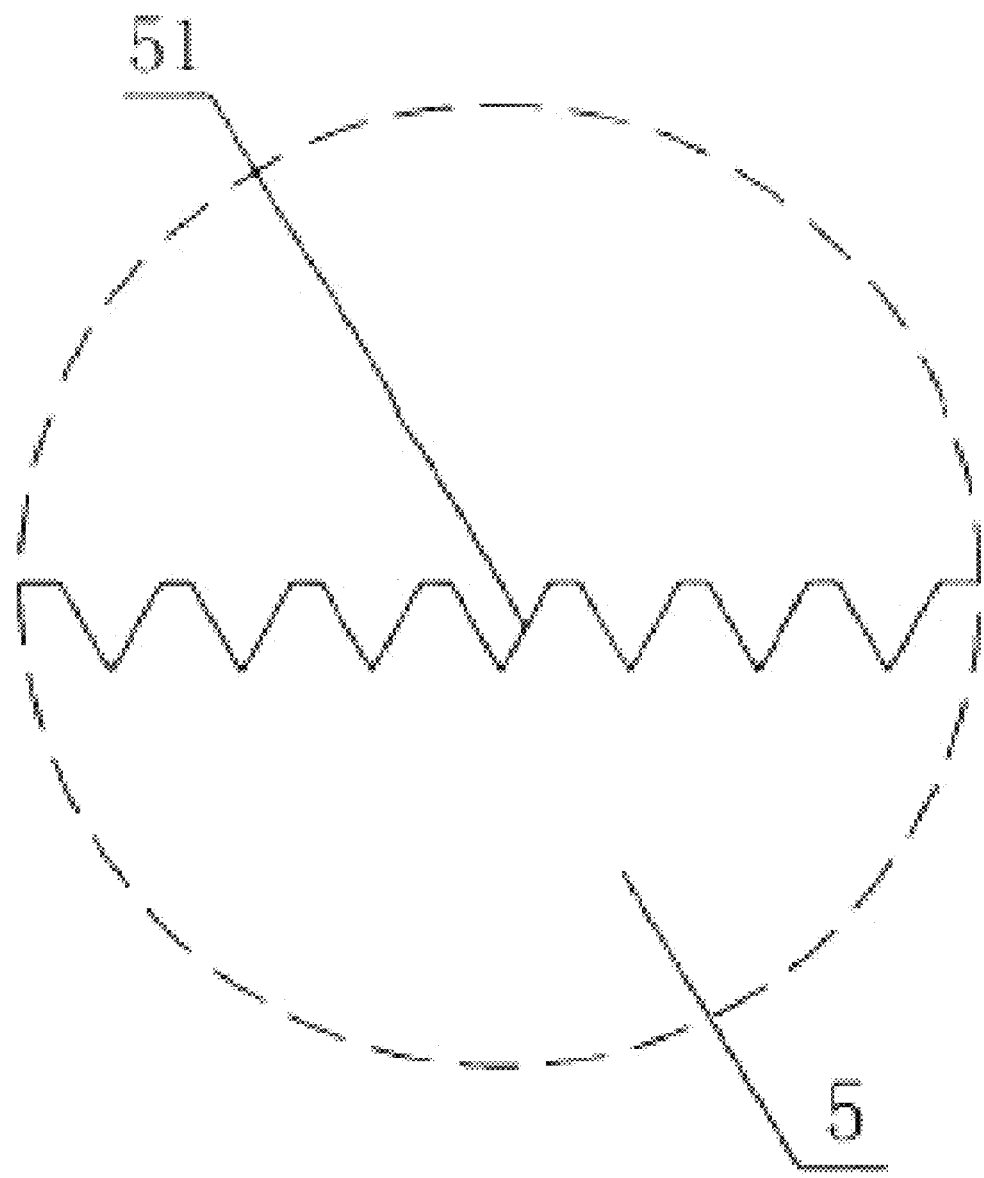
FIG. 3 is a partial enlarged view of grooves at the top of the separating plate 5.

As shown in FIGS. 1 and 2, a reclaimed water reuse device of the invention comprises a biological reaction tank 1, a membrane module 2, a water pool 3, a membrane filtering pool 4, a control module 6, an inlet-drainage device 11, a clean water supply device 21, an outlet device 31, a first aeration device 22, a second aeration device 12, a backwash device 23, and a contaminated-soil backflow device 41.

The membrane module 2 is disposed in the membrane filtering pool 4.

A separating plate 5 is disposed in the biological reaction tank 1, and separates the membrane filtering pool 4 from the biological reaction tank 1. Water in the biological reaction tank 1 overflows a top of the separating plate 5 and pours into the membrane filtering pool 4. The ratio between the volume of the biological reaction tank 1 and that of the membrane filtering pool 4 is between 1:1 and 10:1, and more particularly, the ratio is 3:1.

A groove 51 is disposed at the top of the separating plate 5. In this embodiment, the groove 51 is tooth-shaped.

The inlet-drainage device 11 comprises an inlet pipe 111, a drainage pipe 112, and a plurality of electromagnetic valves M0 and M1. The electromagnetic valve M0 is disposed in the inlet pipe 111, and the electromagnetic valve M1 is disposed in the drainage pipe 112.

The outlet device 31 drains water from the water pool 3. The outlet device 31 comprises an outlet pipe 311, a clean water pump 312, and an electromagnetic valve M9. The clean water pump 312 and the electromagnetic valve M9 are attached to the outlet pipe 311.

The clean water supply device 21 comprises a clean water supply pipe 211, a self-priming pump 212, an electromagnetic valve M8, a manual valve H8, and a pressure gauge P. The clean water supply pipe 211 connects the water pool 3 to the membrane module 2. The self-priming pump 212, the electromagnetic valve M8, the manual valve H8, and the pressure gauge P are connected to the clean water supply pipe 211 and disposed between the membrane module 2 and the water pool 3. The pressure gauge P detects self-priming pressure of the self-priming pump 212, and transfers the pressure signal to the control module 6.

The first aeration device 22 aerates the membrane module 2, and comprises a first aeration pipe 221, an electromagnetic valve M5 and a manual valve H5. The electromagnetic valve M5 and the manual valve H5 are connected to the first aeration pipe 221. The first aeration pipe 221 extends to the bottom of the membrane module 2.

The second aeration device 12 aerates the biological reaction tank 1, and comprises a second aeration pipe 121, an electromagnetic valve M3 and a manual valve H3. The electromagnetic valve M3 and the manual valve H3 are connected to the second aeration pipe 121. The second aeration pipe 121 extends to the bottom of the biological reaction tank 1.

The aeration pipe 221 and the second aeration pipe 121 have a common entrance.

The backwash device 23 washes back the membrane filtering pool 4 and connects the outlet device 31 to the membrane module 2.

The backwash device 23 comprises a backwash pipe 231, a first backwash supporting pipe 232, a second backwash supporting pipe 233, electromagnetic valves M6 and M7, and a manual valve H6.

One end of the backwash pipe 231 is connected to the outlet pipe 311, and the other end of the backwash pipe 231 is a common end of the first backwash supporting pipe 232 and the second backwash supporting pipe 233. The first backwash supporting pipe 232 is, at its other end, disposed in the membrane filtering pool 4. The second backwash supporting pipe 233 and the clean water supply pipe 211 are connected to the membrane module 2

The electromagnetic valve M6 is connected to the first backwash supporting pipe 232, and the electromagnetic valve M7 is connected to the second backwash supporting pipe 233.

The contaminated-soil backflow device 41 is disposed in the membrane filtering pool 4, and is connected to the inlet-drainage device 11 and the biological reaction tank 1.

The contaminated-soil backflow device 41 comprises a backflow pipe 411, a first backflow supporting pipe 412, a second backflow supporting pipe 413, a backflow pump 414, and electromagnetic valves M2 and M4.

The backflow pump 414 is disposed at the bottom of the membrane filtering pool 4, and connected to one end of the backflow pipe 411. The other end of the backflow pipe 411 is a common end of the first backflow supporting pipe 412 and the second backflow supporting pipe 413. The first backflow supporting pipe 412 terminates at the top of the biological reaction tank 1, and the second backflow supporting pipe 413 is connected to the outlet pipe 112.

The electromagnetic valve M4 is connected to the first backflow supporting pipe 412, and the electromagnetic valve M2 is connected to the second backflow supporting pipe 413.

As shown in FIG. 2, the control module 6 controls operation of the inlet-drainage device 11, the clean water supply device 21, the outlet device 31, the first aeration device 22, the backwash device 23, the contaminated-soil backflow device 41, and the clean water supply device 21 according to preset data and/or signal received from the clean water supply device 21. The preset data comprises a timing period T0, a delay time T1, a pressure threshold F1, a frequency threshold f1, and so on. The operating signal of the clean water supply device 21 comprises a pressure signal of the pressure gauge P, etc. Based on the pressure signal, the control module 6 detects the operating state of the membrane module 2, and correspondingly performs physical or chemical backwash of the membrane module 2.

Referring to FIG. 2, the control module 6 directly controls operating states of the electromagnetic valves M0 ... M9, the self-priming pump 212, the clean water pump 312, and the backflow pump 414.

As the reclaimed water reuse device of the invention is in a normal operating state, the backflow pump 414, the self-priming pump 212, the clean water pump 312, and the electromagnetic valves M4, M3, M5, M8 and M9 are enabled; the other valves are disabled. Manual valves H3, H5 and H6 may be manually adjusted to change gas flux and water flux. During normal operation, contaminated water flows in via the inlet pipe 111, after biological processing and being filtered by the membrane module 2 in the membrane filtering pool 4, clean water is generated.

Figure 4:
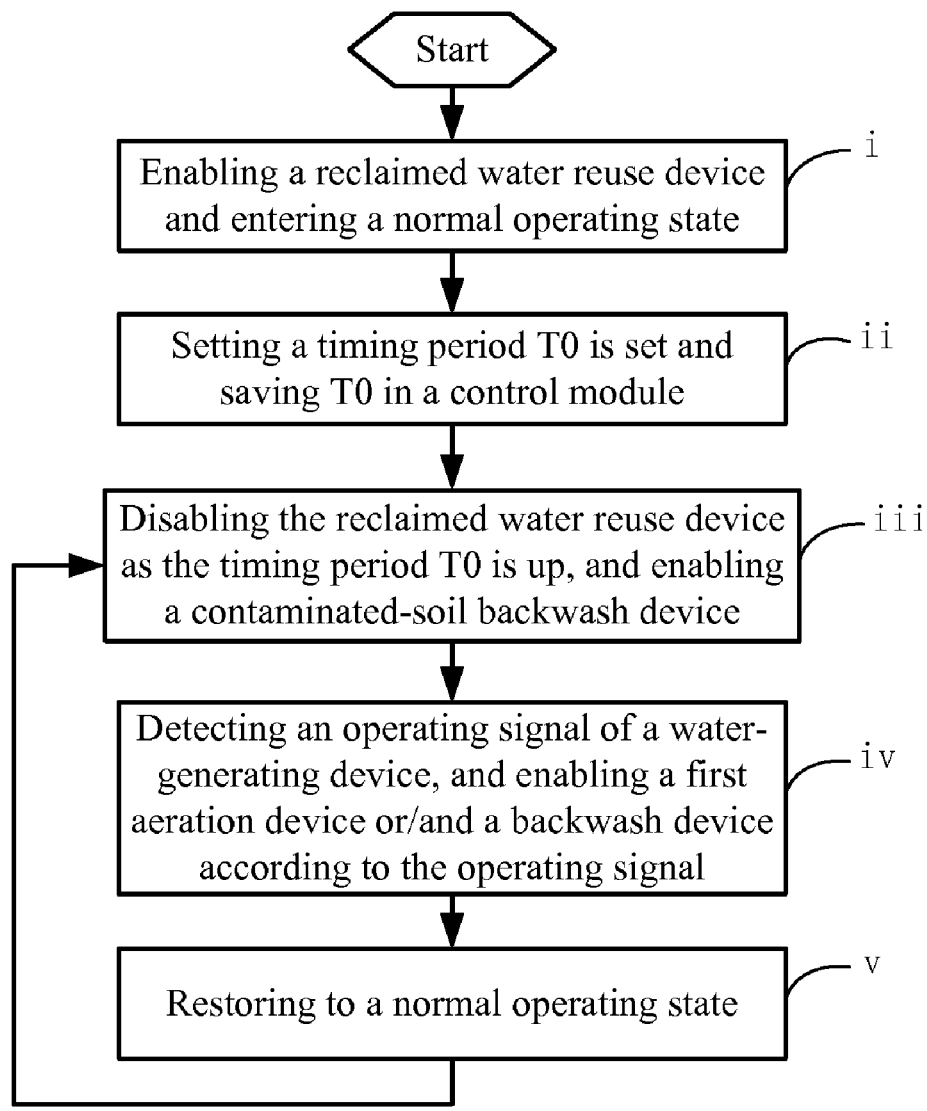
FIG. 4 is a high-level flowchart diagram illustrating a method for cleaning of a reclaimed water reuse device according to one embodiment of the invention.

As shown in FIG. 4, a method for cleaning a reclaimed water reuse device comprises the following steps:

i. The reclaimed water reuse device is enabled, and enters a normal operating state;

ii. A timing period T0 is set, and saved in the control module 6;

iii. As the timing period T0 is up, the reclaimed water reuse device is disabled; after a delay time T1, the control module 6 enables the contaminated-soil backflow device 41, so that contaminated soil deposited at the bottom of the membrane filtering pool 4 flows back to a front portion of the biological reaction tank 1;

iv. The control module 6 detects an operating signal of the clean water supply device 21, and enables the first aeration device 22 or/and the backwash device 23 according to the operating signal, so as to perform physical or chemical backwash of the membrane module 2; and v. After the backwash is completed, the reclaimed water reuse device restores to a normal operating state under the control of the control module 6, and the process returns to step iii.

Figure 5:
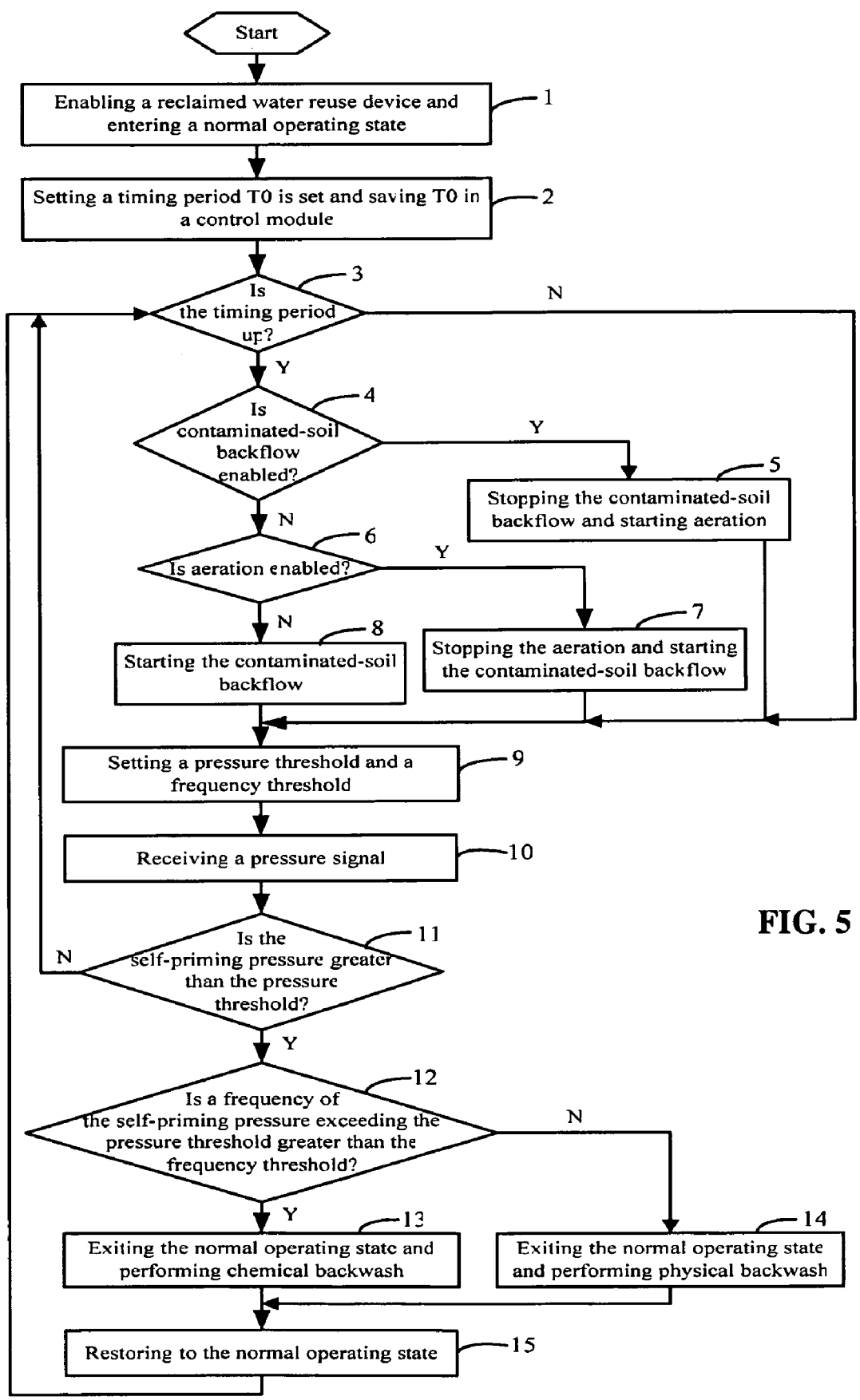
FIG. 5 is a detailed flowchart diagram illustrating a method for cleaning of a reclaimed water reuse device according to one embodiment of the invention.

As shown in FIG. 5, a detailed method for cleaning a reclaimed water reuse device comprises the following steps:

1. The reclaimed water reuse device is enabled, and enters a normal operating state;
2. A timing period T0 is set, and saved in the control module 6;
3. The control module 6 detects whether the timing period is up, if the timing period is not up, the process proceeds to step 4, otherwise the process proceeds to step 9;
4. If the timing period is up, the control module 6 detects whether contaminated-soil backflow is enabled. In this embodiment, the control module 6 detects whether contaminated-soil backflow is enabled by checking the signal from the backwash pump 414, or an operating history saved in the control module 6. If the contaminated-soil backflow is enabled, the process proceeds to step 5, otherwise the process proceeds to step 6;
5. After a deposit time T1, the control module 6 stops the contaminated-soil backflow and starts aeration. In this embodiment, the control module 6 switches on the electromagnetic valve M5 in the first aeration device 22 and the electromagnetic valve M3 in the second aeration device 12, so that gas is led to the bottom of the membrane module 2 and the biological reaction tank 1 via the first aeration pipe 221 and the second aeration pipe 121, respectively;
6. The control module 6 detects whether aeration is enabled. In this embodiment, the control module 6 detects whether aeration is enabled by checking states of the electromagnetic valve M5 and the electromagnetic valve M3. If the aeration is enabled, the process proceeds to step 7, otherwise the process proceeds to step 8;
7. The control module 6 stops the aeration, and enables the contaminated-soil backflow after the deposit time T1;
8. The control module 6 enables the contaminated-soil backflow after the deposit time T1;
9. The control module 6 sets a pressure threshold F1 and a frequency threshold f1. In this embodiment, the pressure threshold F1 is between +0.04 and −0.04 MPa with respect to the standard pressure of 760 mmHg (101,325 Pa).
10. The control module 6 receives a pressure signal from the pressure gauge P, the pressure gauge indicating self-priming pressure of the self-priming pump 212;
11. The control module 6 detects whether the self-priming pressure is greater than the pressure threshold F1. If the self-priming pressure is greater than the pressure threshold F1, the process proceeds to step 12, otherwise the process returns to step 3;
12. The control module 6 detects whether a frequency at which the self-priming pressure of the self-priming pump 212 exceeds the pressure threshold F1 is greater than the frequency threshold f1. If the frequency at which the self-priming pressure of the self-priming pump 212 exceeds the pressure threshold F1 is greater than the frequency threshold f1, the process proceeds to step 13, otherwise the process proceeds to step 14. In this embodiment, the frequency at which the self-priming pressure of the self-priming pump 212 exceeds the pressure threshold F1 is equal to 1/(the amount of time the self-priming pressure of the self-priming pump 212 exceeds the pressure threshold F1 during this time interval–the amount of time the self-priming pressure of the self-priming pump 212 exceeds the pressure threshold F1 during the immediately preceding time interval);
13. the control module 6 exits the normal operating state, and performs chemical backwash on the membrane module 2;
14. The control module 6 exits the normal operating state, and enables the first aeration device 22 and the backwash device 23, so as to perform physical backwash on the membrane module 2; and
15. Under the control of the control module 6, the reclaimed water reuse device is restored to its normal operating state, and then the process returns to step 3.

The above steps 4-7 alternately enable contaminated-soil backflow and aeration. The above steps 10-14 implement combination of the physical backwash and the chemical backwash. The membrane module 2 is not required to be taken out of the membrane filtering pool 4 for cleaning. All of this contributes to a good cleaning efficiency.

A detailed process of the physical backwash is as follows: the control module 6 enables the electromagnetic valves M5 and M7 and the clean water pump 312, the clean water pump 312 pours filtered water into a membrane tube and a membrane hole in the membrane module 2, so as to perform backwash thereon. Meanwhile, blowing aeration is performed at the bottom of the membrane module 2, and contaminant deposited on an upper surface of the membrane module 2 is cleaned. The entire process lasts for 2-10 minutes.

A detailed process of the chemical backwash is as follows: cleaning chemical agent such as acid, alkali, oxidant (sodium hypochlorite) and so on is added to the water pool 3, and let the biological reaction tank 1 and the membrane filtering pool 4 stands for 5-15 minutes. In this embodiment, the soaking time is 10 minutes. The control module 6 enables the electromagnetic valve M1 to drain clean water from the upper portion of the biological reaction tank 1. And then disables the electromagnetic valve M1.

The control module 6 enables the contaminated-soil backflow pump 414 and the electromagnetic valve M4, so that active contaminated soil in the membrane filtering pool 4 flows back to the biological reaction tank 1.

The control module 6 disables the electromagnetic valve M4 and enables the electromagnetic valve M2 after the backflow is completed, so as to discharge clean water in the upper portion of the membrane filtering pool 4 to outside via the contaminated-soil backflow pump 414.

The control module 6 disables the contaminated-soil backflow pump 414 after the membrane filtering pool 4 is evacuated.

The control module 6 enables the clean water pump 312 and the electromagnetic valve M6, and allows the cleaning chemical agent to flow into the membrane filtering pool 4, so as to immerse the membrane module 2.

The control module 6 disables the electromagnetic valve M6 after the cleaning chemical agent immerses the membrane module 2, enables the electromagnetic valves M5 and M7, and performs chemical backwash on the membrane module 2. Meanwhile, a membrane surface is scrubbed via aeration.

The control module 6 disables the electromagnetic valves M5 and M7 and the clean water pump 312, enables the contaminated-soil backflow pump 414 and the electromagnetic valve M2, so as to evacuate the cleaning chemical agent in the membrane filtering pool 4, and then disables the contaminated-soil backflow pump 414 and the electromagnetic valve M2.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for cleaning a reclaimed water reuse device, the reclaimed water reuse device comprising a clean water supply device, a first aeration device, a backwash device and a membrane module, the method comprising
    (a) detecting an operating signal of said clean water supply device;
    (b) enabling said first aeration device or said backwash device according to said operating signal, so as to perform backwash of said membrane module; and
    (c) completing washing back and restoring to a normal operating state.

2. The method of claim 1, wherein said reclaimed water reuse device further comprises a contaminated-soil backflow device, a second aeration device and a control module.

3. The method of claim 2, further comprising setting a timing period and enabling said contaminated-soil backflow device when said timing period is up.

4. The method of claim 3, wherein the step of setting a timing period and enabling said contaminated-soil backflow device as said timing period is up comprises:
    (a) starting and entering an operating state by said reclaimed water reuse device;
    (b) setting said timing period; and
    (c) alternately enabling said contaminated-soil backflow device, said first aeration device and said second aeration device.

5. The method of claim 2, wherein said clean water supply device comprises a clean water supply device, a self-priming pump, an electromagnetic valve, and a pressure gauge.

6. The method of claim 5, wherein the step of enabling said first aeration device or said backwash device according to said operating signal, so as to perform backwash on said membrane module comprises
    (a) setting a pressure threshold and a frequency threshold;
    (b) receiving a pressure signal from said pressure gauge by said control module, the pressure signal indicating a self-priming pressure of said self-priming pump;
    (c) comparing said pressure threshold with said self-priming pressure; and
    (d) if said pressure threshold is less than said self-priming pressure, detecting whether the frequency at which the self-priming pressure of said self-priming pump exceeds said pressure threshold is greater than said frequency threshold.

7. The method of claim 6, wherein the step of enabling said first aeration device or said backwash device according to said operating signal, so as to perform backwash on said membrane module further comprises
    (a) if the frequency at which the self-priming pressure of said self-priming pump exceeds said pressure threshold is greater than said frequency threshold, performing chemical backwash on said membrane module; and
    (b) if the frequency at which the self-priming pressure of said self-priming pump exceeds said pressure threshold is less than said frequency threshold, enabling said first aeration device and said backwash device to perform physical backwash of said membrane module.

8. A method for cleaning a reclaimed water reuse device, the reclaimed water reuse device comprising a biological reaction tank; a membrane module; a water pool; an inlet-drainage device; an outlet device; a clean water supply device; a first aeration device; a backwash device; and a membrane filtering pool; wherein said inlet-drainage device has the ability to feed water into and drain water from said biological reaction tank; said clean water supply device has the ability to supply clean water from said membrane module to said water pool; said first aeration device has the ability to clean said membrane module; said membrane module is disposed in said membrane filtering pool; said backwash device is connected to said membrane module via said outlet device; and said backwash device has the ability to wash back said membrane filtering pool; the method comprising:
    (a) detecting an operating signal of said clean water supply device;
    (b) enabling said first aeration device or said backwash device according to said operating signal, so as to perform backwash of said membrane module; and
    (c) completing washing back and restoring to a normal operating state.

9. The method of claim 8, wherein said reclaimed water reuse device further comprises a contaminated-soil backflow device, a second aeration device and a control module.

10. The method of claim 9, further comprising setting a timing period and enabling said contaminated-soil backflow device when said timing period is up.

11. The method of claim 10, wherein the step of setting a timing period and enabling said contaminated-soil backflow device as said timing period is up comprises:
    (a) starting and entering an operating state by said reclaimed water reuse device;
    (b) setting said timing period; and
    (c) alternately enabling said contaminated-soil backflow device, said first aeration device and said second aeration device.

12. The method of claim 9, wherein said clean water supply device comprises a clean water supply device, a self-priming pump, an electromagnetic valve, and a pressure gauge.

13. The method of claim 12, wherein the step of enabling said first aeration device or said backwash device according to said operating signal, so as to perform backwash on said membrane module comprises (a) setting a pressure threshold and a frequency threshold;
(b) receiving a pressure signal from said pressure gauge by said control module, the pressure signal indicating a self-priming pressure of said self-priming pump;
(c) comparing said pressure threshold with said self-priming pressure; and
(d) if said pressure threshold is less than said self-priming pressure, detecting whether the frequency at which the self-priming pressure of said self-priming pump exceeds said pressure threshold is greater than said frequency threshold.

14. The method of claim 13, wherein the step of enabling said first aeration device or said backwash device according to said operating signal, so as to perform backwash on said membrane module further comprises (a) if the frequency at which the self-priming pressure of said self-priming pump exceeds said pressure threshold is greater than said frequency threshold, performing chemical backwash on said membrane module; and
(b) if the frequency at which the self-priming pressure of said self-priming pump exceeds said pressure threshold is less than said frequency threshold, enabling said first aeration device and said backwash device to perform physical backwash of said membrane module.

* * * * *